(12) United States Patent
Kuriki et al.

(10) Patent No.: US 8,658,313 B2
(45) Date of Patent: Feb. 25, 2014

(54) METHOD FOR MANUFACTURING ELECTRODE, AND METHOD FOR MANUFACTURING POWER STORAGE DEVICE AND POWER GENERATION AND STORAGE DEVICE HAVING THE ELECTRODE

(75) Inventors: Kazutaka Kuriki, Kanagawa (JP); Junpei Momo, Kanagawa (JP); Takafumi Mizoguchi, Kanagawa (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 527 days.

(21) Appl. No.: 12/891,449

(22) Filed: Sep. 27, 2010

(65) Prior Publication Data
US 2011/0076561 A1   Mar. 31, 2011

(30) Foreign Application Priority Data
Sep. 30, 2009   (JP) .................................. 2009-226568

(51) Int. Cl.
*H01M 4/58*   (2010.01)

(52) U.S. Cl.
USPC ....................................................... 429/218.1

(58) Field of Classification Search
None
See application file for complete search history.

(56) References Cited

U.S. PATENT DOCUMENTS

| 4,409,134 A | 10/1983 | Yamazaki |
| 7,402,829 B2 | 7/2008 | Green |
| 7,683,359 B2 | 3/2010 | Green |
| 2008/0153000 A1 | 6/2008 | Salot et al. |
| 2008/0251126 A1* | 10/2008 | Yamazaki et al. ............ 136/261 |
| 2009/0001936 A1 | 1/2009 | Green |
| 2009/0111020 A1* | 4/2009 | Yamaguchi et al. .......... 429/207 |
| 2010/0285358 A1* | 11/2010 | Cui et al. ................... 429/218.1 |

FOREIGN PATENT DOCUMENTS

| JP | 2003-017040 A | 1/2003 |
| JP | 2006-505901 A | 2/2006 |
| JP | 2007-123096 A | 5/2007 |
| JP | 2008-159589 A | 7/2008 |
| JP | 2009-134917 A | 6/2009 |
| WO | 2004/042851 A2 | 5/2004 |

* cited by examiner

*Primary Examiner* — Maria J Laios
(74) *Attorney, Agent, or Firm* — Fish & Richardson P.C.

(57) ABSTRACT

The characteristics of a power storage device are improved and the lifetime of the power storage device is prolonged. An electrode is manufactured through the following steps: a step of forming an electrode film; a step of forming a damage layer by ion doping on the electrode film; and a step of providing a damage region between the damage layer and a surface. Alkali ion insertion and extraction can be performed by dipping of an electrode, in which the damage layer and the damage region are formed, in a solution containing an alkali ion. A space in which the volume of the electrode is expanded can be secured by the formation of the damage layer and the damage region. Note that another lithium may be used instead of an alkali metal.

10 Claims, 9 Drawing Sheets

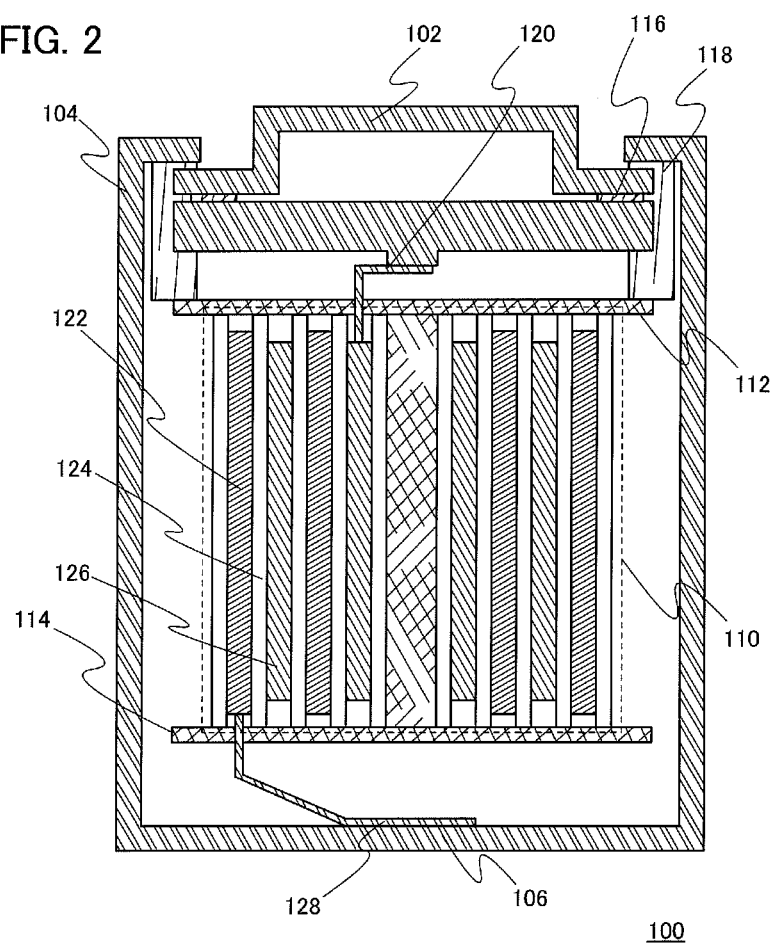

METHOD FOR MANUFACTURING ELECTRODE, AND METHOD FOR MANUFACTURING POWER STORAGE DEVICE AND POWER GENERATION AND STORAGE DEVICE HAVING THE ELECTRODE

BACKGROUND OF THE INVENTION

1. Field of the Invention

One embodiment of the present invention relates to a method for manufacturing an electrode and a method for manufacturing a power storage device and a power generation and a storage device having the electrode.

2. Description of the Related Art

In recent years, with an increase of environmental engineering, development of power generation devices which pose fewer burdens on the environment (e.g., solar power generation device) than power generation devices using conventional power generation methods has been actively conducted. Concurrently with the development of power generation device, development of power storage device has also been underway.

As an example of a power storage device, a lithium ion battery can be given. A lithium ion battery is widely prevalent since energy density thereof is high and the lithium ion battery is well suited for miniaturization. As a negative electrode material of a lithium ion battery, a material in/from which lithium ions can be inserted and extracted is preferably used. Although graphite or silicon can be given as examples of the negative electrode material of a lithium ion battery, silicon is especially preferable. This is because theoretical capacity of silicon is ten times as high as that of graphite and silicon is expected to be a host material of lithium ions (e.g., see Patent Document 1). In addition, as another example of a power storage device, development of an asymmetric capacitor and a hybrid capacitor has also been underway.

However, in the case where silicon or the like is used for an electrode of a lithium ion battery, volume expansion in the electrode becomes a problem in some cases. The volume expansion in the electrode causes deterioration in characteristics of the electrode and leads to reduction in yield and reliability. A lithium ion battery disclosed in Patent Document 2 includes a stack having expansion cavities for an electrode and each expansion cavity is formed in a recessed zone.

REFERENCES

[Patent Document 1] Japanese Translation of PCT International Application No. 2006-505901

[Patent Document 2] Japanese Published Patent Application No. 2008-159589

SUMMARY OF THE INVENTION

According to one embodiment of the present invention, it is an object to improve characteristics and extend a lifetime of a power storage device by making it possible to expand the volume in an electrode of the power storage device.

One embodiment of the present invention is a method for manufacturing a negative electrode. In the manufacturing method, an active material layer is formed over a current collector; a damage layer is formed by ion doping in the active material layer; and a damage region is provided between the damage layer and a surface of the active material layer. When the negative electrode in which the damage layer and the damage region are formed is, for example, dipped in a solution containing alkali ions, the alkali ions can be inserted into the damage layer and the damage region.

In the above structure of one embodiment of the present invention, silicon is preferably used as a material of the active material layer, and the crystallinity of the active material layer is not particularly limited. For example, the active material layer may be amorphous silicon, polycrystalline silicon, or single crystal silicon. Single crystal silicon can be formed by attachment of a single silicon substrate onto a glass substrate, an electrode current collector substrate, or the like.

In the above structure of one embodiment of the present invention, it is preferable that an active material layer is formed over a glass substrate and a solar cell is mounted over the glass substrate. This is because when a solar cell is mounted over a glass substrate, the solar cell and a power storage device can be formed over the same substrate, whereby a small power storage device (a small power generation and storage device) capable of generating power can be manufactured.

Note that in the above structure of one embodiment of the present invention, lithium ions are preferably used as an alkali ion.

Note that in this specification, "a power generation and storage device" is a device having functions of power generation and power storage.

By obtaining an electrode in which the volume can be expanded, characteristics of a power storage device is improved and a lifetime thereof can be extended.

BRIEF DESCRIPTION OF THE DRAWINGS

In the accompanying drawings:

FIG. 2 illustrates a cross-sectional view of a battery according to one embodiment of the present invention;

DETAILED DESCRIPTION OF THE INVENTION

Figure 1:
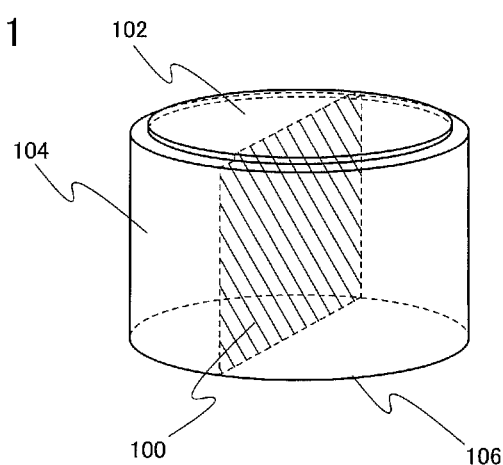
FIG. 1 illustrates an example of a battery according to one embodiment of the present invention.

Hereinafter, embodiments of the present invention are described with reference to the drawings. However, the present invention is not limited to the following description. It is readily appreciated by those skilled in the art that modes and details can be variously changed without departing from the spirit and scope of the present invention. Therefore, the present invention is not construed as being limited to the following description of the embodiments. Note that reference numerals denoting the same portions are used in common in different drawings.

Embodiment 1

In this embodiment, a battery according to one embodiment of the present invention and an electrode which can be applied to the battery will be described.

FIG. 1 is a perspective view illustrating an example of a cylindrical rechargeable battery according to one embodiment of the present invention. Note that the rechargeable battery according to one embodiment of the present invention is not limited to the cylindrical rechargeable battery, and may be a square rechargeable battery.

The cylindrical rechargeable battery in FIG. 1 has a closed space surrounded by a battery sidewall 104, a battery cover 102, and a battery bottom 106.

FIG. 2 is a cross-sectional view taken along a cross section 100 of the cylindrical rechargeable battery in FIG. 1.

The battery sidewall 104 and the battery bottom 106 may be formed using conductive materials, and a material which has sufficient mechanical strength and chemical resistance in an usage environment may be selected. As such a material, an aluminum alloy can be used, for example. The closed space surrounded by the battery sidewall 104, the battery bottom 106, and the battery cover 102 is provided in the battery. In the closed space, an electrode 110 is provided, for example. A wound electrode is illustrated as an example of the electrode 110 in FIG. 2; however, this embodiment is not limited to this.

An upper portion (a battery cover 102 side) and a lower portion (a battery bottom 106 side) of the electrode 110 are sandwiched between insulating plates 112 and 114, and conductors 120 and 128 are taken out through the insulating plates 112 and 114, respectively. It is preferable that the conductor 120 taken out through the insulating plate 112 which is the upper portion (the battery cover 102 side) be electrically connected to the battery cover 102 through a resistor 116. In order to prevent abnormal heat generation due to excessive current, a heat sensitive resistor whose resistance is increased with an increase in temperature is preferably used as the resistor 116. The conductor 128 taken out through the insulating plate 114 which is the lower portion (the battery bottom 106 side) is electrically connected to the battery bottom 106. Note that the battery bottom 106 and the battery sidewall 104 are conducting.

The battery sidewall 104, the battery cover 102, and the insulating plate 112 which is the upper portion (the battery cover 102 side) are preferably physically connected to each other with a gasket 118 interposed therebetween. It is preferable that the gasket 118 have an insulating property; however, the kind of the gasket 118 is not limited to this, and any gasket can be used as long as the battery cover 102 and the battery sidewall 104 are insulated from each other.

Although not illustrated, a structure in which a safety valve is provided inside the battery in order to cut electrical connection between the battery cover 102 and the electrode 110 in the case where short-circuit occurs between a negative electrode 122 and a positive electrode 126 (an electrode whose polarity is opposite to that of the negative electrode 122) or in the case where a pressure in the battery is increased by being heated may be employed.

Note that a center pin may be provided in the center of the electrode 110 to fix the electrode 110.

The electrode 110 includes the negative electrode 122, the positive electrode 126, and a separator 124 which is provided between the negative electrode 122 and the positive electrode 126. The positive electrode 126 included in the electrode 110 is electrically connected to the battery cover 102 through the conductor 120. The negative electrode 122 included in the electrode 110 is electrically connected to the battery bottom 106 through the conductor 128.

The negative electrode 122 preferably includes a negative electrode current collector and a negative electrode active material layer provided on both sides of the negative electrode current collector. Note that the negative electrode active material layer may be provided only on one side of the negative electrode current collector. The negative electrode current collector may be formed using metal foil such as aluminum or titanium, for example. The negative electrode active material layer includes a negative electrode material in/from which alkali ions which is an electrode reactive material can be inserted and extracted. For example, silicon can be used as the negative electrode material in/from which alkali ions can be inserted and extracted. By using silicon for the negative electrode material, the negative electrode can be formed thin and can be reduced in size and weight, which is preferable. For example, as compared to the case where graphite is used for the negative electrode material, the thickness of the negative electrode can be reduced to about one tenth.

However, the negative electrode material in/from which alkali ions can be inserted and extracted has a significant problem of volume expansion.

It is an object of one embodiment of the present invention to improve yield and reliability by formation of a space for volume expansion in an electrode of a lithium ion battery. Note that one embodiment of the present invention is not limited to the lithium ion, and other alkali ions may be used.

Thus, one embodiment of the present invention is a method for manufacturing an electrode. In the manufacturing method, a silicon layer is formed as a negative electrode active material layer; a damage layer is formed by ion doping on the silicon layer; and a damage region is provided between the damage layer and a surface of the silicon layer. When the electrode in which the damage layer and the damage region are formed is, for example, dipped in a solution containing lithium ions, the lithium ions can be inserted into the damage layer and the damage region, whereby the electrode can be used as an electrode of a lithium ion battery, for example. Note that in one embodiment of the present invention, ions which are inserted into the damage layer and the damage region are not limited to lithium ions, and other alkali ions may be inserted.

Alternatively, one embodiment of the present invention is a method for manufacturing an electrode. In the manufacturing method, a current collector is formed over a glass substrate; a silicon layer is formed as a negative electrode active material layer over the current collector; a damage layer is formed in the silicon layer; a damage region is formed between a surface of the silicon layer and the damage layer; and the silicon layer in which the damage layer and the damage region are formed is dipped in a solution containing lithium ions. Note that in one embodiment of the present invention, ions which are inserted into the damage layer and the damage region are not limited to lithium ions, and other alkali ions may be inserted.

One embodiment of the present invention is a method for manufacturing an electrode. In the manufacturing method, a silicon layer is formed as a negative electrode active material layer over a current collector substrate; a damage layer is formed in the silicon layer; a damage region is formed between a surface of the silicon layer and the damage layer; and the silicon layer in which the damage layer and the damage region are formed is dipped in a solution containing lithium ions. Note that in one embodiment of the present invention, ions which are inserted into the damage layer and the damage region are not limited to the lithium ions, and other alkali ions may be inserted.

Figure 3A:
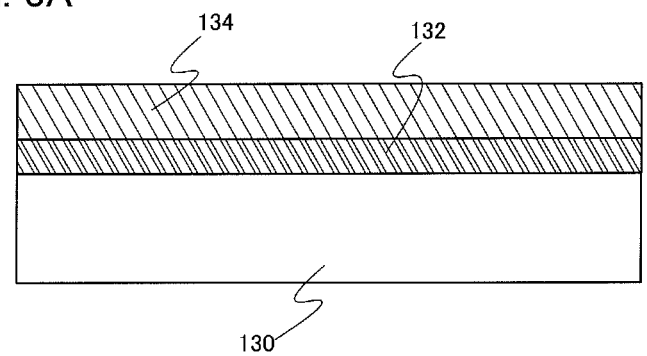
FIGS. 3A to 3C illustrate a method for manufacturing an electrode according to one embodiment of the present invention.
Figure 3B:
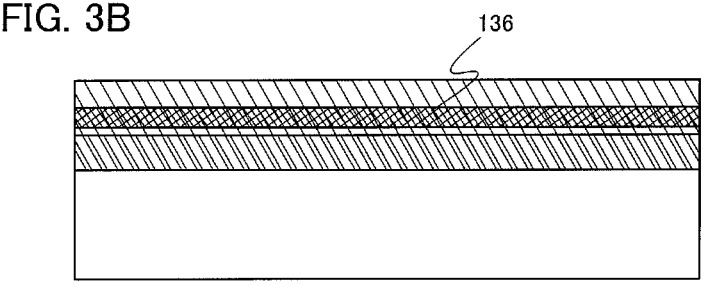
Figure 3C:
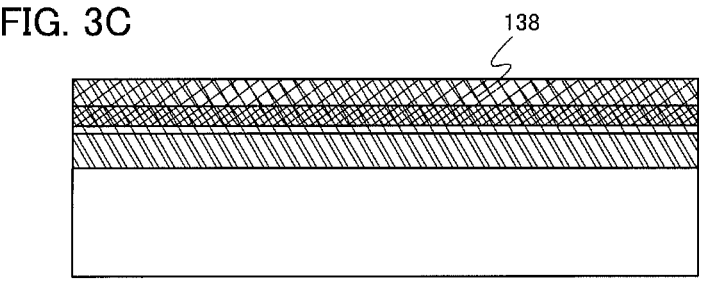

An example of a method for manufacturing an electrode which is the one embodiment of the present invention will be described. In FIGS. 3A to 3C, a method for forming a negative electrode current collector 132 and a negative electrode active material layer 134 over a substrate 130 is illustrated. Note that the negative electrode active material layer 134 is formed using silicon here. However, this embodiment is not limited to this.

First, the negative electrode current collector 132 is formed over the substrate 130 (see FIG. 3A). As a material used for the negative electrode current collector 132, aluminum, nickel, stainless steel, or the like is used, for example. As a method for forming the negative electrode current collector 132, a CVD method or a sputtering method may be used, for example.

Next, the negative electrode active material layer 134 is formed over the negative electrode current collector 132 (see FIG. 3A). As a material used for the negative electrode active material layer 134, silicon is used as described above. Here, the crystallinity of silicon is not particularly limited. For example, silicon may be amorphous silicon, polycrystalline silicon, or single crystal silicon. Amorphous silicon may be formed by a CVD method or a sputtering method. Polycrystalline silicon may be formed by a thermal crystallization method or a laser crystallization method using amorphous silicon. Single crystal silicon can be formed by formation of a damage layer in a single silicon substrate and attachment of the single silicon substrate onto a glass substrate provided with a current collector or a current collector substrate.

Then, a damage layer 136 is formed in the negative electrode active material layer 134 (see FIG. 3B). Here, the damage layer 136 refers to a layer which contains a large amount of defects and the like and hydrogen or the like is combined with the defects; thus a crystalline state or/and a chemical bonding state in the damage layer 136 is distinctly different from the state before the damage layer 136 is formed. For example, the damage layer 136 can be formed by doping of the negative electrode active material layer 134 with hydrogen ions at high energy. The damage layer 136 can be formed at a depth of 0.7 μm from the surface of the negative electrode active material layer 134 by doping at an accelerating voltage of 80 kV, for example.

Note that although either $H^+$ ions or $H_3^+$ ions can be used for forming the damage layer 136, $H^+$ ions are preferably used. The thickness of the negative electrode active material layer 134 is preferably 1.5 μm to 4.0 μm. This is because $H^+$ ions can form the damage layer 136 in a deeper portion (a deep part from the surface) in the negative electrode active material layer 134 as compared to $H_3^+$ ions, whereby a portion in which alkali ions can be inserted and a portion in which the volume can be expanded can be secured largely. Further, a space between the damage layer 136 and the negative electrode current collector 132 can prevent separation or the like which could be generated at an interface between the negative electrode current collector 132 and the negative electrode active material layer 134. Here, it is preferable that a space having a thickness of 100 nm or more be formed between the damage layer 136 and the negative electrode current collector 132.

However, it is difficult to insert and extract alkali ions even when the damage layer 136 is formed only in a deep portion (a deep part from the surface) in the negative electrode active material layer 134. Accordingly, a damage region 138 is preferably formed from the surface of the negative electrode active material layer 134 to the damage layer 136 (see FIG. 3C).

In the case where $H^+$ ions are used for forming the damage layer 136, the damage region 138 can be formed by doping of $H^+$ ions at a lower accelerating voltage than the damage layer 136. For example, in the case where the damage layer 136 is formed at an accelerating voltage of 80 kV, the damage region 138 may be formed at, for example, an accelerating voltage of 40 kV. Alternatively, by doping $H_3^+$ ions, the damage region 138 can be formed at a depth of about one third of the depth between the surface of the negative electrode active material layer 134 and the damage layer 136.

The thickness of the negative electrode active material layer 134 is preferably 1.5 μm to 4.0 μm as described above; therefore, the damage region 138 is preferably formed by doping more than once so as to reach the surface of the negative electrode active material layer 134. For example, in the case where the damage layer 136 is formed at an accelerating voltage of 80 kV, the damage region 138 is formed at an accelerating voltage of 70 kV first, and then the accelerating voltage is lowered by 10 kV, for example. Thus, the damage region 138 can be formed evenly between the surface of the negative electrode active material layer 134 and the damage layer 136.

Note that as described with reference to FIG. 3A to 3C, a glass substrate is preferably used as the substrate 130 over which the negative electrode current collector 132 is formed. Since a photoelectric conversion element can be formed over the glass substrate, a solar cell and an alkali ion battery can be formed over the same substrate by formation of a photoelectric conversion element over the substrate 130, whereby a small battery capable of generating power can be manufactured.

Note that this embodiment is not limited to the above description, and the negative electrode current collector and the negative electrode active material layer including the damage region and the damage layer may be formed on both sides of the substrate.

Alternatively, a flexible plastic substrate or the like may be used instead of the glass substrate.

Next, a method for manufacturing a silicon electrode and a photoelectric conversion element over the same glass substrate is described with reference to FIGS. 4A to 4D and FIGS. 5A to 5D. Note that the case where light enters the photoelectric element from the glass substrate side is described; however, the manufacturing method is not limited thereto.

Figure 4A:
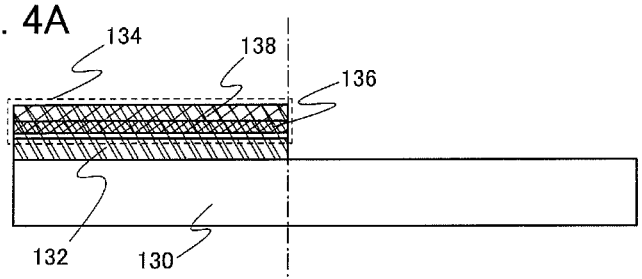
FIGS. 4A to 4D are cross-sectional views illustrating a battery and a method for manufacturing thereof according to one embodiment of the present invention.
Figure 4B:
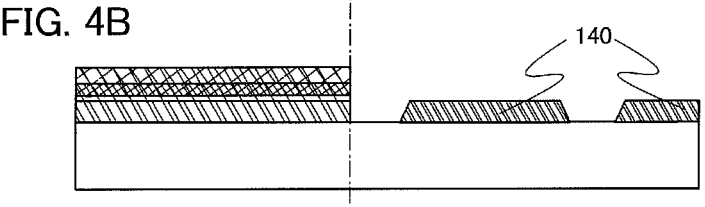

First, as described in FIGS. 3A to 3C, a first conductive layer 140 is formed (see FIG. 4B) over the substrate 130 over which the silicon electrode is formed, that is a region where the silicon electrode is not formed (see FIG. 4A).

Note that the region where the silicon electrode is not formed may be formed by etching or the like of the negative electrode current collector and the negative electrode active material layer in the region.

Alternatively, the first conductive layer 140 may be formed using the negative electrode current collector.

Here, in the case where a structure in which light enters from the substrate 130 is employed, the first conductive layer 140 may be formed using a conductive material having a light-transmitting property. Examples of the conductive material having a light-transmitting property include the following oxides (metal oxides): an In—Sn—Zn—O-based oxide; an In—Al—Zn—O-based oxide; a Sn—Ga—Zn—O-based oxide; an Al—Ga—Zn—O-based oxide; a Sn—Al—Zn—O-based oxide; an In—Zn—O-based oxide; a Sn—Zn—O-based oxide; an Al—Zn—O-based oxide; an In—O-based oxide; a Sn—O-based oxide; and a Zn—O-based oxide. In particular, an indium oxide, an alloy of indium oxide and tin oxide (ITO), a zinc oxide, an alloy of indium oxide and zinc oxide, or the like is preferably used. Alternatively, a Zn—O—Al—N-based material can be used. Further, the conductive material having a light-transmitting property is not limited to an inorganic material and may be an organic material. As the organic material, a material (a conductive high molecular material) including polyaniline, polypyrrole, or polythiophene, or a derivative thereof can be used.

Figure 4C:
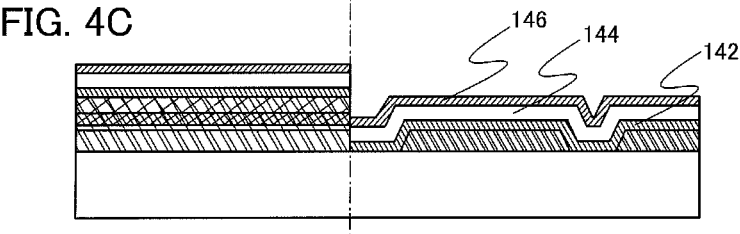
Figure 4D:
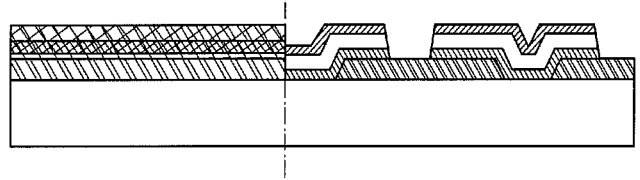

Next, a p-type semiconductor layer 142, an i-type semiconductor layer 144, and an n-type semiconductor layer 146 are stacked over the first conductive layer 140 in that order (see FIG. 4C).

The p-type semiconductor layer refers to a semiconductor layer in which holes are dominant as carriers transferring electric charges. An impurity element imparting p-type conductivity (for example, boron or aluminum) as one conductivity type is added to the p-type semiconductor layer at the same time as or after the formation of the p-type semiconductor layer.

The n-type semiconductor layer refers to a semiconductor layer in which electrons are dominant as carriers transferring electric charges. An impurity element imparting n-type conductivity (for example, phosphorus or arsenic) as one conductivity type is added to the n-type semiconductor layer at the same time as or after the formation of the n-type semiconductor layer.

The i-type semiconductor layer refers to, unlike the p-type semiconductor layer and the n-type semiconductor layer, an intrinsic semiconductor layer to which an impurity element imparting one conductivity type is not added.

Next, part of a stacked semiconductor layer (in which the p-type semiconductor layer 142, the i-type semiconductor layer 144, and the n-type semiconductor layer 146 are stacked) formed as described above is etched away so that the stacked semiconductor layer is separated into island shapes. At this time, it is preferable that semiconductor layers over the negative electrode active material layer 134 be etched together.

Figure 5A:
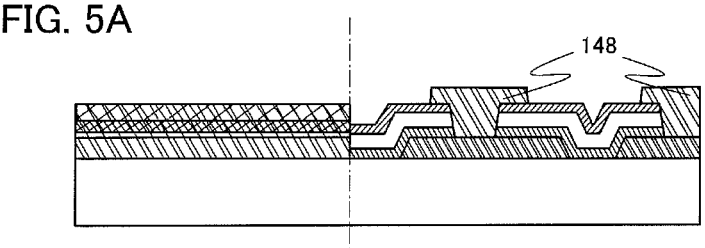
FIGS. 5A to 5D are cross-sectional views illustrating a battery and a method for manufacturing thereof according to one embodiment of the present invention.

Next, a second conductive layer 148 is formed in contact with the stacked semiconductor layer in a desired position (see FIG. 5A). In the case where the first conductive layer 140 is formed using a light-transmitting conductive material (that is, in the case where light enters from a substrate 130 side), the second conductive layer 148 may be formed using a metal material such as aluminum, platinum, gold, silver, copper, titanium, tantalum, or tungsten. In particular, a material that easily reflects light, such as aluminum, silver, titanium, or tantalum is preferably used because light that cannot be absorbed in the i-type semiconductor layer 144 can enter the i-type semiconductor layer 144 again; thus, photoelectric conversion efficiency can be improved.

As described above, the photoelectric conversion element can be formed over the substrate.

Note that the stacking order of the semiconductor layers formed over the first conductive layer 140 is not limited to the above order, and the n-type semiconductor layer, the i-type semiconductor layer, and the p-type semiconductor layer may be stacked in that order. At this time, it is preferable that light enter not from the substrate 130 side but from a top surface of the photoelectric conversion element. Therefore, the second conductive layer 148 is preferably formed using a light-transmitting conductive material at this time.

That is, the conductive layer on the p-type semiconductor layer side is preferably formed using a light-transmitting conductive material. This is mainly because the diffusion length of holes is short as a result of the lifetime of a hole that is half that of an electron, and photoelectric conversion is often performed on the side where light enters, for example. Note that in the case where the thickness of the i-type semiconductor layer used for photoelectric conversion is sufficiently thin, the incidence side of light may have n-type conductivity.

Note that although the case where silicon is used for the semiconductor layer is described above, silicon carbide, germanium, gallium arsenide, indium phosphide, zinc selenide, gallium nitride, silicon germanium, or the like may be used. Alternatively, a semiconductor material including an organic material, a semiconductor material including a metal oxide, or the like may be used.

Figure 5B:
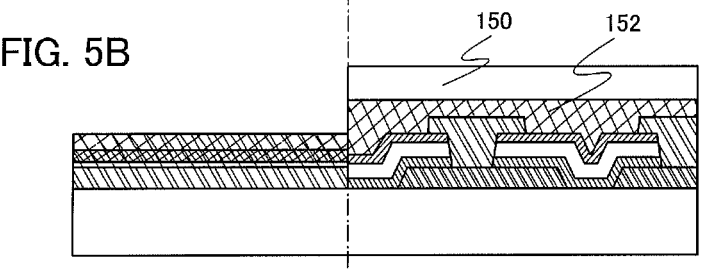

Next, the photoelectric conversion element is covered with a resin film 152 or the like and a sealing substrate 150 or the like is provided over the resin film 152; thus the photoelectric conversion element is sealed (see FIG. 5B). Note that sealing in this embodiment is not limited thereto, and the resin film 152 or the sealing substrate 150 is not necessarily used as long as the photoelectric conversion element can be sealed.

Then, a negative electrode 154 can be obtained by dipping of the substrate 130, in which the negative electrode current collector 132 and the negative electrode active material layer 134 are formed, in a solution containing lithium ions so that lithium ions are inserted into the negative electrode active material layer 134.

Figure 5C:
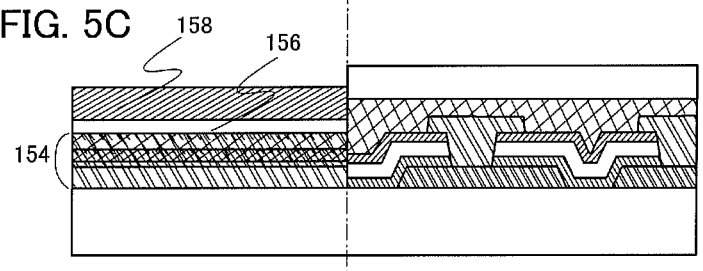

Next, a separator 156 is formed over the negative electrode 154, and a positive electrode 158 is formed over the separator 156 (see FIG. 5C).

The separator 156 may be formed using a porous film which is impregnated with an electrolyte solution, which is a liquid electrolyte. As a material of the porous film, a synthetic resin substance, a ceramic substrate, or the like may be used. As examples of the material of the porous film, polyethylene, polypropylene, or the like can be preferably used.

Note that as the separator 156, paper, nonwoven fabric, a glass fiber, or a synthetic fiber such as nylon (polyamide), vinylon (also referred to as vinalon) (a polyvinyl alcohol based fiber), polyester, acrylic, polyolefin, polyurethane, and the like can be used. However, a material which does not dissolve in an electrolyte solution is selected.

As the electrolyte solution in which the separator 156 is dipped, for example, a mixture solution of ethylene carbonate (EC) and diethyl carbonate (DEC) in which lithium hexafluorophosphate ($LiPF_6$) is contained may be used. Alternatively, as an electrolyte, lithium chloride (LiCl), lithium fluoride (LiF), lithium perchlorate ($LiClO_4$), lithium fluoroborate ($LiBF_4$), lithium trifluoromethansulfonate ($LiCF_3SO_3$), and the like can be used. In the case where alkali metal ions other than lithium ions are used, for example, sodium chloride (NaCl), sodium fluoride (NaF), sodium perchlorate ($NaClO_4$), sodium fluoroborate ($NaBF_4$), potassium chloride (KCl), potassium fluoride (KF), potassium perchlorate ($KClO_4$), and potassium fluoroborate ($KBF_4$), and the like can be used alone or in combination, being dissolved in a solvent.

Examples of the solvent for the electrolyte solution include cyclic carbonates such as propylene carbonate (PC), butylene carbonate (BC), and vinylene carbonate (VC); acyclic carbonates such as dimethyl carbonate (DMC), ethylmethyl carbonate (hereinafter abbreviated as EMC), methylpropyl carbonate (MPC), methylisobutyl carbonate (MIBC), and dipropyl carbonate (DPC); aliphatic carboxylic acid esters such as methyl formate, methyl acetate, methyl propionate, and ethyl propionate; g-lactones such as g-butyrolactone; acyclic ethers such as 1,2-dimethoxyethane (DME), 1,2-diethoxyethane (DEE), and ethoxymethoxy ethane (EME); cyclic ethers such as tetrahydrofuran and 2-methyltetrahydrofuran; dimethylsulfoxide; 1,3-dioxolane and the like; alkyl phosphate esters such as trimethyl phosphate, triethyl phosphate, and trioctyl phosphate and fluorides thereof, all of which can be used either alone or in combination.

The positive electrode preferably includes a current collector and an active material in a manner similar to the negative electrode. For example, a composite oxide layer containing lithium metal which is to be a positive electrode active material may be formed over the positive electrode current collector. Note that other alkali metal may be used instead of lithium.

As the positive electrode active material, a material containing ions which is to be carriers and a transition metal can be used, for example. As the material containing ions which is to be carriers and a transition metal, a material which is represented by a general formula $A_xM_yPO_z$ (x>0, y>0, z>0) can be used. Here, A indicates alkali metal such as lithium, sodium, or potassium or earth alkali metal such as beryllium, magnesium, calcium, strontium, or barium. M indicates transition metal such as iron, nickel, manganese, or cobalt. As the material represented by the general formula $A_xM_yPO_z$ (x>0, y>0, z>0), lithium iron phosphate, sodium iron phosphate, or the like can be given. As materials represented by A and M, one or a plurality of the above materials may be selected.

Alternatively, a material which is represented by a general formula $A_xM_yO_z$ (x>0, y>0, z>0) can be used. Here, A indicates alkali metal such as lithium, sodium, or potassium or earth alkali metal such as beryllium, magnesium, calcium, strontium, or barium. M indicates transition metal such as iron, nickel, manganese, or cobalt. As the material represented by the general formula $A_xM_yO_z$ (x>0, y>0, z>0), lithium cobaltate, lithium manganate, lithium nickelate, or the like can be given. As materials represented by A and M, one or a plurality of the above materials may be selected.

A positive electrode active material layer may be formed by applying a paste of mixture of conductive agent, binder, and the like over the current collector or by a sputtering method.

As a material of the positive electrode current collector, titanium, aluminum, or the like can be used.

Figure 5D:
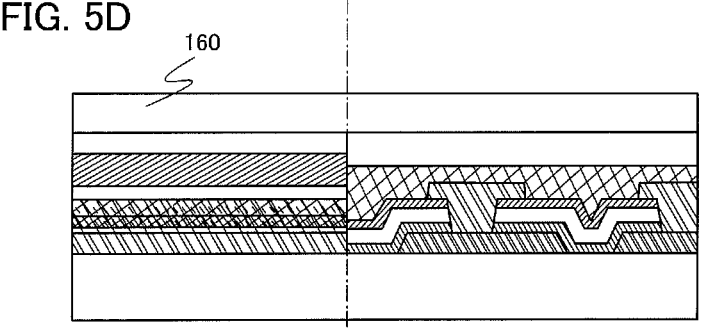

Next, it is preferable that the negative electrode 154, the separator 156, and the positive electrode 158 formed as described above be sealed using a sealing substrate 160 (see FIG. 5D). In particular, for convenience, the height of a region in which a storage battery is formed and the height of a region in which a photoelectric conversion element is formed are preferably substantially equal to each other. Note that sealing may be performed using a gasket and a bond substrate without using resin or the like.

Alternatively, the region in which the storage battery is formed and the region in which the photoelectric conversion element is formed may be sealed with a flexible film or the like.

Figure 6:
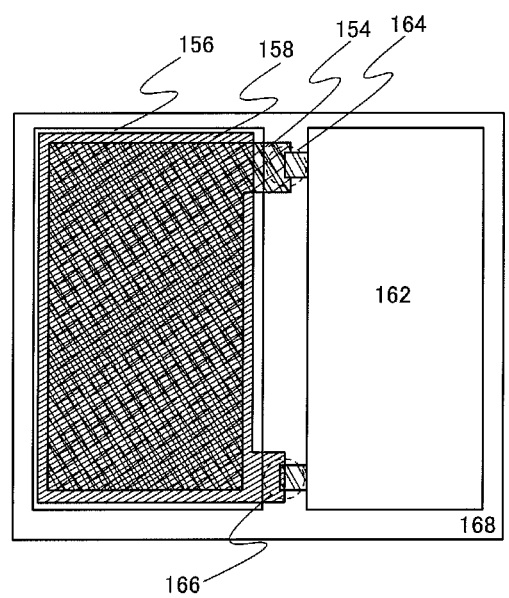
FIG. 6 illustrates a structure of a battery according to one embodiment of the present invention.

FIG. 6 illustrates an example of a top surface of a power generation and storage device in which the storage battery manufactured in the above manner and the photoelectric conversion element are formed over the same substrate.

A power generation and storage device 168 illustrated in FIG. 6 includes a photoelectric conversion region 162 in which a plurality of photoelectric conversion elements are provided. One terminal taken out from the photoelectric conversion region 162 and the negative electrode 154 of the storage battery are electrically connected to each other in a first connection portion 164, and the other terminal extended from the photoelectric conversion region 162 and the positive electrode 158 of the storage battery are electrically connected to each other in a second connection portion 166. The separator 156 is provided between the negative electrode 154 and the positive electrode 158. The plurality of photoelectric conversion elements are preferably connected in series.

As illustrated in FIG. 6, part of the negative electrode 154 and part of the positive electrode 158 are taken out so as not to be short-circuited, and the taken out portions and the terminals taken out from the photoelectric conversion region 162 are electrically connected to each other. Each of the two terminals taken out from the photoelectric conversion region 162 may be formed using the first conductive layer 140 or the second conductive layer 148.

Note that a charge circuit is preferably formed in a power storage device and a power generation and storage device. In this embodiment, the charge circuit may be formed in the photoelectric conversion region 162, for example.

As described above, a silicon electrode having a space in which the volume can be expanded can be manufactured using a method for manufacturing an electrode according to one embodiment of the present invention. Accordingly, breakdown of the silicon electrode can be suppressed, and yield and reliability can be improved.

As described above, the silicon electrode and a photoelectric conversion element (a solar cell) can be formed over the same substrate with the use of a glass substrate as the substrate, whereby a small power storage device (a small power generation and storage device) capable of generating power can be manufactured.

Note that the silicon electrode can be manufactured using an existing device used in a semiconductor process without contamination of the inside of the device; therefore, the existing device can be utilized effectively.

The battery described in this embodiment can have favorable characteristics (for example, cycle properties), long lifetime, and high reliability. Further, the battery can be manufactured with high yield.

Embodiment 2

In this embodiment, a capacitor of one embodiment of the present invention will be explained.

Figure 7A:
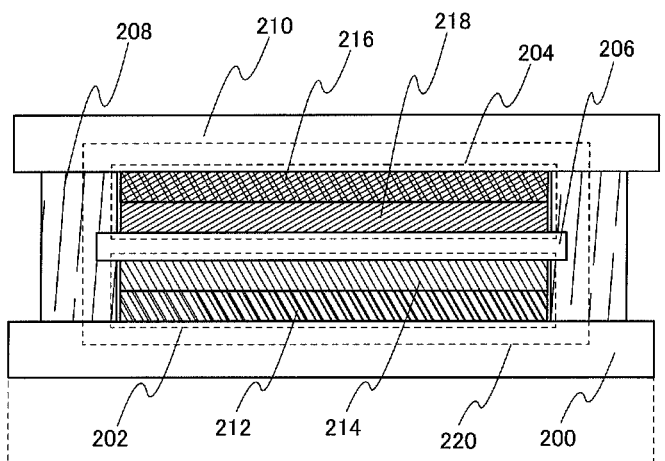
FIGS. 7A and 7B illustrate a structure of a capacitor according to one embodiment of the present invention.
Figure 7B:
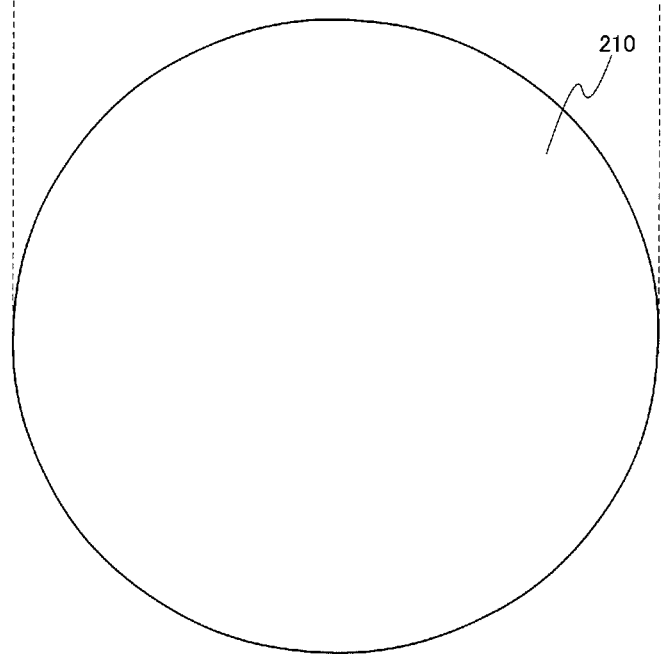

In FIGS. 7A and 7B, a cross-sectional view (FIG. 7A) and a top view (FIG. 7B) of an example of the capacitor of one embodiment of the present invention is illustrated. In the capacitor illustrated in FIGS. 7A and 7B, an electrode 220 is interposed between a bottom cover 200 and a top cover 210, and the electrode 220 is provided in a closed space formed by the bottom cover 200, the top cover 210 and a gasket 208. Note that in FIGS. 7A and 7B, an example of cylindrical capacitor is described; however, the capacitor of one embodiment of the present invention is not limited thereto and the capacitor may be a square shape.

The electrode 220 includes a positive electrode 202, a negative electrode 204, and a separator 206 interposed therebetween. The positive electrode 202 includes a positive electrode current collector 212 and a positive electrode active material layer 214. The negative electrode 204 includes a negative electrode current collector 216 and a negative electrode active material layer 218.

The positive electrode current collector 212 in the positive electrode 202 can be formed using a material and a method which are similar to those of the positive electrode current collector in Embodiment 1.

In the capacitor of one embodiment of the present invention, the positive electrode active material layer 214 in the positive electrode 202 can be formed using a material such as activated carbon, carbon nanotube, fullerene, or polyacene. As the positive electrode active material layer 214, for example, activated carbon serving as a positive electrode active material may be provided over the positive electrode current collector 212. For example, the positive electrode active material layer can be formed as follows: the activated carbon serving as the positive electrode active material, acetylene black, and polyvinylidene fluoride are mixed at a ratio of 79:5:16; the mixture is soaked in N-methylpyrrolidone (NMP) and stirred to be paste; the paste is applied over the current collector; and the paste is dried. The positive electrode active material layer 214 may also be formed with pressure, if necessary.

The negative electrode current collector 216 in the negative electrode 204 can be formed using a material and a method which are similar to those of the negative electrode current collector in Embodiment 1.

The negative electrode active material layer 218 in the negative electrode 204 can be formed using a material and a method which are similar to those of the negative electrode active material layer in the negative electrode in Embodiment 1.

That is, the negative electrode 204 can be formed using a material similar to that of the negative electrode in Embodiment 1.

Note that the gasket 208 preferably has insulating properties; however, this embodiment is not limited to this as long as at least the positive electrode 202 and the negative electrode 204 are not to be short-circuited.

Note that as an electrolyte solution filled in the closed space, an electrolyte solution similar to that used in Embodiment 1 may be used.

Figure 8A:
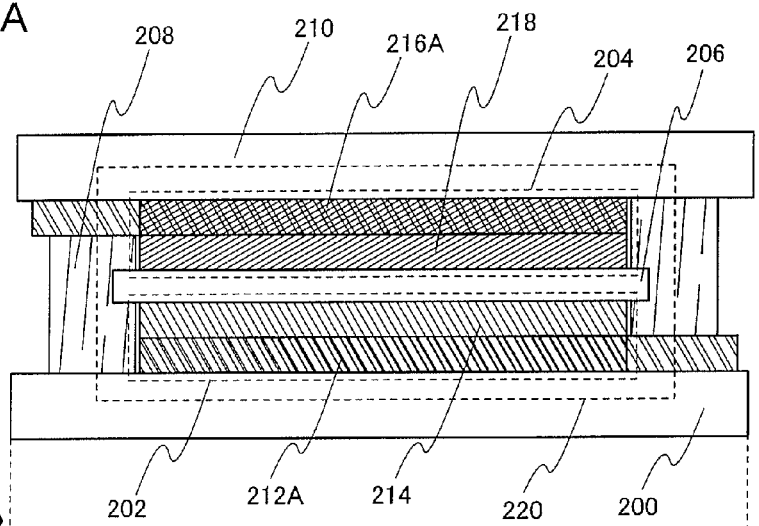
FIGS. 8A and 8B illustrate a structure of a capacitor according to one embodiment of the present invention.
Figure 8B:
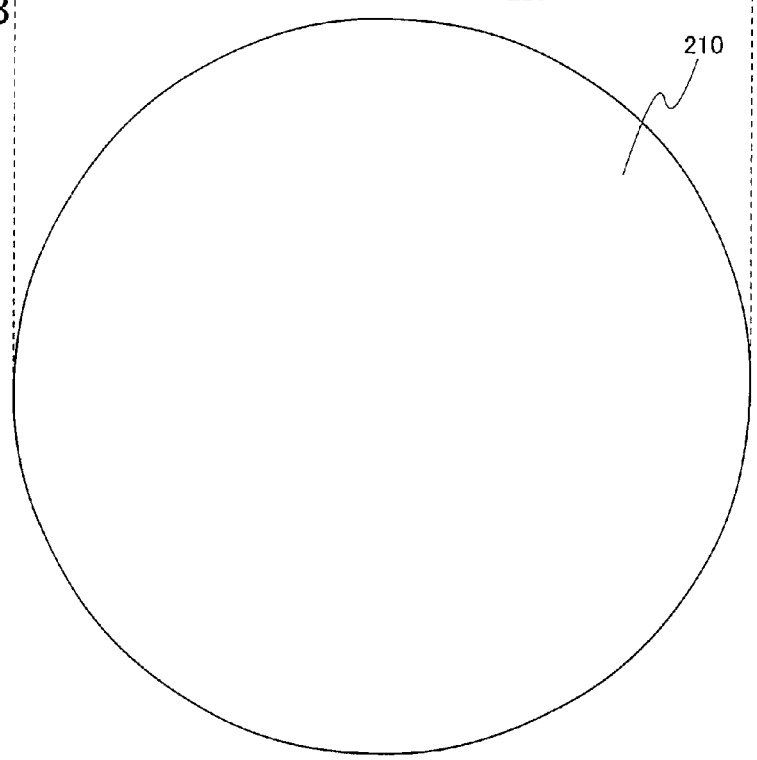

Note that although conductor and the like for electrically connecting the positive electrode 202 and the negative electrode 204 to outside are not illustrated in FIGS. 7A and 7B, the positive electrode 202 and the negative electrode 204 may be taken out, in which case a positive electrode current collector 212A in the positive electrode 202 and a negative electrode current collector 216A in the negative electrode 204 are stuck out to the directions different from each other, as illustrated in FIGS. 8A and 8B, for example.

Figure 9A:
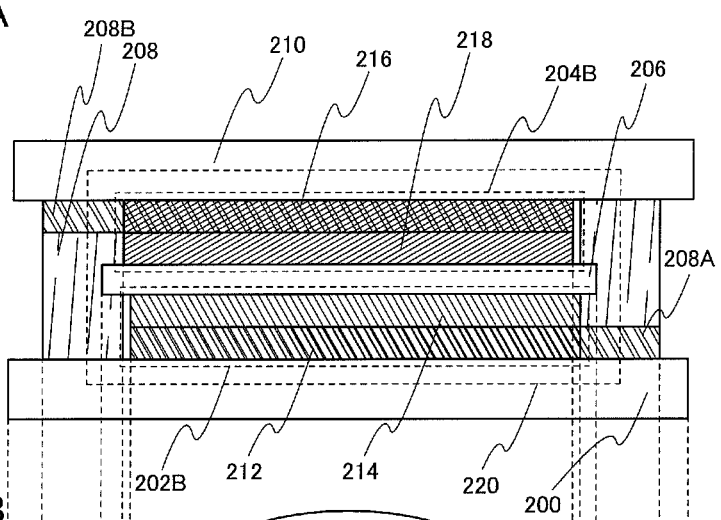
FIGS. 9A and 9B illustrate a structure of a capacitor according to one embodiment of the present invention.
Figure 9B:
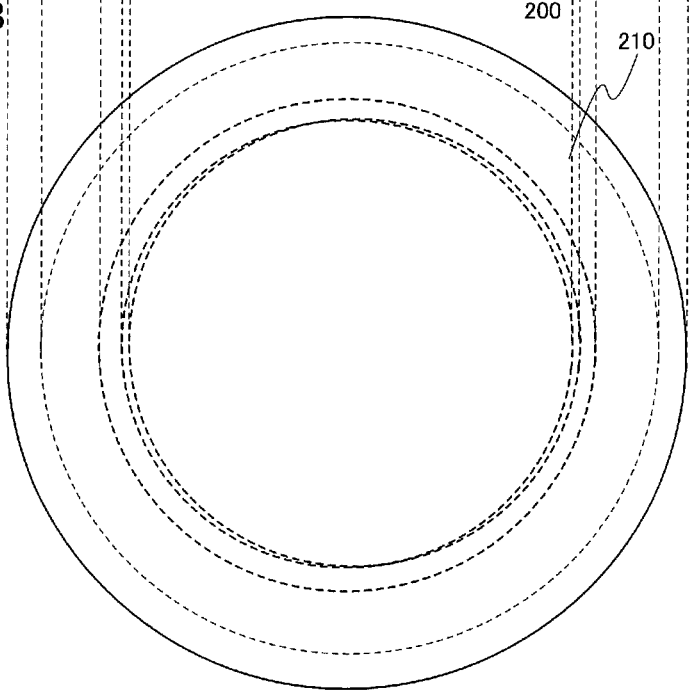

Alternatively, a part of the gasket 208 may be formed using a conductive material as described in FIGS. 9A and 9B. For example, a structure may be used, in which a conductive portion 208A is formed at the bottom cover 200 side of the gasket 208, a positive electrode 202B is electrically connected to the conductive portion 208A, a conductive portion 208B is formed at the top cover 210 side of the gasket 208, and a negative electrode 204B is electrically connected to the conductive portion 208B.

Note that although the case where the bottom cover 200 and the top cover 210 are formed using insulating materials is described above, the material thereof is not limited to this and the bottom cover 200 and the top cover 210 may be formed using aluminum alloy, or the like. In this case, the gasket 208 insulates the bottom cover 200 and the top cover 210, the bottom cover 200 is used as a positive electrode, and the top cover 210 is used as a negative electrode.

As described above, a capacitor can be manufactured in a manner similar to that of the battery described in Embodiment 1.

The capacitor described in this embodiment can have a high degree of freedom of layout, favorable characteristics (for example, negative capacitor and cycle properties), long lifetime, and high reliability. Further, the capacitor can be manufactured with high yield.

This application is based on Japanese Patent Application Ser. No. 2009-226568 with Japan Patent Office on September, 30, in 2009, the entire contents of which are hereby incorporated by reference.

What is claimed is:

1. A method for manufacturing an electrode, comprising the steps of:
   forming a silicon layer;
   introducing $H^+$ ions into the silicon layer through a surface of the silicon layer so that a first damage portion is formed in the silicon layer; and
   introducing $H_3^+$ ions into the silicon layer so that a second damage portion is formed in the silicon layer;
   wherein the second damage portion is located between the surface of the silicon layer and the first damage portion.

2. A method for manufacturing a power storage device, comprising the steps of:
   providing a separator over an electrode manufactured by the method for manufacturing an electrode according to claim 1; and
   forming another electrode, whose polarity is opposite to that of the electrode, over the separator.

3. The method for manufacturing an electrode according to claim 2, wherein the electrode over the separator comprises carbon.

4. The method for manufacturing an electrode according to claim 1, further comprising the step of dipping the silicon layer in a solution containing lithium ion.

5. The method for manufacturing an electrode according to claim 1, wherein a thickness of the silicon layer is 1.5 μm to 4.0 μm.

6. A method for manufacturing an electrode, comprising the steps of:
   forming a current collector over substrate;
   forming a silicon layer over the current collector;
   introducing $H^+$ ions into the silicon layer through a surface of the silicon layer so that a first damage portion is formed in the silicon layer;
   introducing $H_3^+$ ions into the silicon layer so that a second damage portion is formed in the silicon layer;
   wherein the second damage portion is located between the surface of the silicon layer and the first damage portion.

7. A method for manufacturing a power storage device, comprising the steps of:
   providing a separator over an electrode manufactured by the method for manufacturing an electrode according to claim 6; and
   forming another electrode, whose polarity is opposite to that of the electrode, over the separator.

8. The method for manufacturing an electrode according to claim 7, wherein the electrode over the separator comprises carbon.

9. The method for manufacturing an electrode according to claim 6, further comprising the step of dipping the silicon layer in a solution containing lithium ion.

10. The method for manufacturing an electrode according to claim 6, wherein a thickness of the silicon layer is 1.5 μm to 4.0 μm.

* * * * *